(12) United States Patent
Suefuji (10) Patent No.: US 9,400,054 B2
(45) Date of Patent: Jul. 26, 2016

(54) MECHANICAL SEAL DEVICE (71) Applicant: EAGLE INDUSTRY CO., LTD., Tokyo (JP)

(72) Inventor: Yoshihiro Suefuji, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/770,535

(22) PCT Filed: May 27, 2014

(86) PCT No.: PCT/JP2014/064005
§ 371 (c)(1),
(2) Date: Aug. 26, 2015

(87) PCT Pub. No.: WO2014/192761
PCT Pub. Date: Dec. 4, 2014

(65) Prior Publication Data
US 2016/0003362 A1    Jan. 7, 2016

(30) Foreign Application Priority Data
May 27, 2013    (JP) ................................. 2013-111134

(51) Int. Cl.
*F16J 15/34*     (2006.01)
*F16J 15/36*     (2006.01)

(52) U.S. Cl.
CPC ............... *F16J 15/36* (2013.01); *F16J 15/348* (2013.01); *F16J 15/3436* (2013.01); *F16J 15/3464* (2013.01); *F16J 15/363* (2013.01)

(58) Field of Classification Search
CPC ..... F16J 15/34; F16J 15/3436; F16J 15/3452; F16J 15/3444; F16J 15/36; F16J 15/363
See application file for complete search history.

(56) References Cited

U.S. PATENT DOCUMENTS 3,673,445 A * 6/1972 Rutz .................... F16J 15/3452
                                                            310/88
4,136,885 A * 1/1979 Uhrner .................... F16J 15/36
                                                            277/374

(Continued)

FOREIGN PATENT DOCUMENTS

CN         2176466 Y      9/1994
JP         S35-020015     8/1935

(Continued)

OTHER PUBLICATIONS

Chinese Office Action dated Mar. 25, 2016 with English translation.

*Primary Examiner* — Gilbert Lee
(74) *Attorney, Agent, or Firm* — Harness, Dickey & Pierce, P.L.C.

(57) ABSTRACT

A mechanical seal device includes a rotary ring 7 which is fixed to a rotary shaft 300, a fixed ring 4 which is slidably in contact with the rotary ring 7 and forms an annular seal surface S, a bellows 5 which supports the fixed ring 4 so as to bias the fixed ring 4 toward the rotary ring 7, a spring 6 which biases the fixed ring 4 toward the rotary ring 7, and a seal cover 2 which is attached to a housing 200, supports the bellows 5 such that an outer peripheral surface of the bellows 5 is on the inside A of the housing 200 relative to the seal surface S, and supports the spring 6 at a position located on the outside B of the housing 200 relative to the seal surface S and side by side with the bellows 5.

1 Claim, 5 Drawing Sheets

(56) References Cited

U.S. PATENT DOCUMENTS

| | | | | |
|---|---|---|---|---|
| 4,275,889 A | * | 6/1981 | Butler | F16J 15/36 277/375 |
| 5,199,719 A | * | 4/1993 | Heinrich | F16J 15/36 277/374 |
| 5,964,466 A | * | 10/1999 | Hintenlang | F16J 15/36 277/371 |
| 5,984,312 A | * | 11/1999 | Hintenlang | F16J 15/36 277/371 |
| 8,800,995 B2 | | 8/2014 | Suefuji | |
| 2011/0037232 A1 | | 2/2011 | Suefuji | |
| 2012/0139186 A1 | | 6/2012 | Suefuji | |

FOREIGN PATENT DOCUMENTS

| WO | 2010/004809 A1 | 1/2010 |
|---|---|---|
| WO | 2010/123025 A1 | 10/2010 |

* cited by examiner

PRIOR ART

MECHANICAL SEAL DEVICE

CROSS-REFERENCE TO RELATED APPLICATIONS

This application is a National Stage of International Application No. PCT/JP2014/064005, filed May 27, 2014, which claims priority to Japanese Application No. 2013-111134, filed on May 27, 2013. The entire disclosures of each of the above applications are incorporated herein by reference.

FIELD

The present disclosure relates to a mechanical seal device.

BACKGROUND

Conventionally, as a mechanical seal device for sealing a special liquid such as a chemical which dose not allow the use of a special high-temperature pump or an O ring, there is known a mechanical seal device which includes a metal bellows. In addition, there is known a mechanical seal device which is configured as a cartridge-type mechanical seal device in order to improve assembly and make the mechanical seal device compact (Patent Documents 1 and 2).

Figure 5:
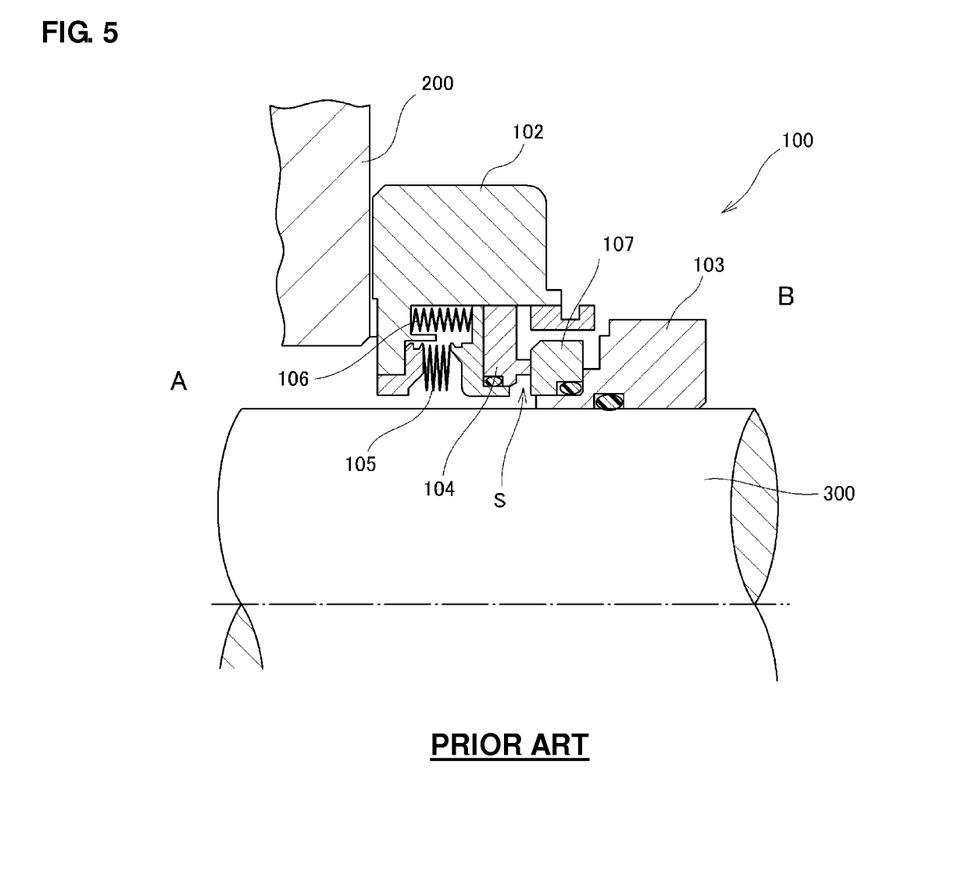
FIG. 5 is a schematic cross-sectional view of a mechanical seal device according to the conventional art.

With reference to FIG. 5, a conventional cartridge-type mechanical seal device will be described. FIG. 5 is a schematic cross-sectional view for explaining the configuration of a mechanical seal device according to the conventional art.

A mechanical seal device 100 shown in FIG. 5 is provided between a housing 200 such as the casing of a pump or the like and a rotary shaft 300, and seals the inside A of the housing 200 from the outside (air side) B. The mechanical seal device 100 has a seal cover 102 which is attached to the housing 200 and a sleeve 103 which is fit on the rotary shaft 300. In the seal cover 102, a fixed ring 104 as an annular member, a bellows 105, and a spring 106 are provided. In the sleeve 103, a rotary ring 107 as an annular member is provided.

The seal cover 102 and the sleeve 103 are attached to the housing 200 and the rotary shaft 300 respectively such that the fixed ring 104 and the rotary ring 107 are in contact with each other. The fixed ring 104 and the rotary ring 107 are slidably in contact with each other to form an annular seal surface S, and the seal state is thereby formed. The bellows 105 and the spring 106 are provided so as to be stretchable in an axial direction, and bias the fixed ring 104 toward the rotary ring 107 to thereby enhance the adhesion of the seal surface S.

Herein, in the cartridge-type mechanical seal device 100 described above, its cost is reduced and the cartridge-type mechanical seal device is made compact by reducing the number of ridges of the metal bellows 105 which requires high manufacturing cost, and an insufficient biasing force is supplemented by using the spring 106. In addition, the spring 106 is disposed on the outer peripheral side of the bellows 105 in order to avoid exposure to a liquid.

However, in the above cartridge configuration in which the bellows 105 and the spring 106 are arranged in a radial direction, a reduction in radial dimensions is limited, and hence attachment space is restricted and the range of devices to which the mechanical seal device can be applied is limited. In addition, slurry having a high density contained in a target liquid to be sealed is pushed outward by a centrifugal force caused by the rotation of the rotary shaft 300, and is pushed into a groove between the ridges on the inner peripheral side of the bellows 105. When the mechanical seal device is used for a long time period, there is a possibility that the slurry deposited in the groove affects stretchability of the bellows 105.

[Patent Document 1] WO 2010/004809
[Patent Document 2] WO 2010/123025

SUMMARY

An object of the present disclosure is to provide the mechanical seal device capable of increasing the application range and maintaining performance in long-term use.

In order to achieve the above object, the mechanical seal device in the present disclosure is a mechanical seal device which seals space between a shaft hole provided in a housing and a rotary shaft inserted into the shaft hole and hence seals a liquid in the housing including a first annular member which is fixed to the rotary shaft, a second annular member which is slidably in contact with the first annular member and forms an annular seal surface, a bellows which supports the second annular member so as to bias the second annular member toward the first annular member, a biasing member which biases the second annular member toward the first annular member, and a seal cover which is attached to the housing, supports the bellows such that an outer peripheral surface of the bellows is on the inside of the housing relative to the seal surface, and supports the biasing member at a position located on the outside of the housing relative to the seal surface and side by side with the bellows in an axial direction of the rotary shaft.

According to the present disclosure, the bellow and the biasing member are not arranged in a radial direction, and hence it is possible to make radial dimensions of the device compact. In addition, a target liquid to be sealed is sealed on the outer peripheral side of the bellows, and hence slurry or the like in the target liquid to be sealed is not deposited in a groove of the bellows.

The mechanical seal device preferably further includes a retainer which has a tubular portion fixed to the second annular member and extending from the fixed end in the axial direction on an inner peripheral side of the bellows and a flange portion extending from an end portion opposite to the fixed end of the tubular portion in a radially outward direction and receiving a biasing force of the biasing member.

By providing the retainer described above, it is possible to easily implement a configuration in which the target liquid to be sealed is sealed on the outer peripheral side of the bellows, and the bellows and the biasing member are arranged in the axial direction.

According to the present disclosure, it is possible to increase the application range and maintain the performance in long-term use.

DETAILED DESCRIPTION

Hereinbelow, with reference to the drawings, the best mode for carrying out the disclosure will be illustratively described in detail based on an embodiment. However, the scope of the present disclosure is not limited only to dimensions, materials, shapes, and relative arrangements of constituent parts described in the embodiment unless specifically described.

(Embodiment)

Figure 1:
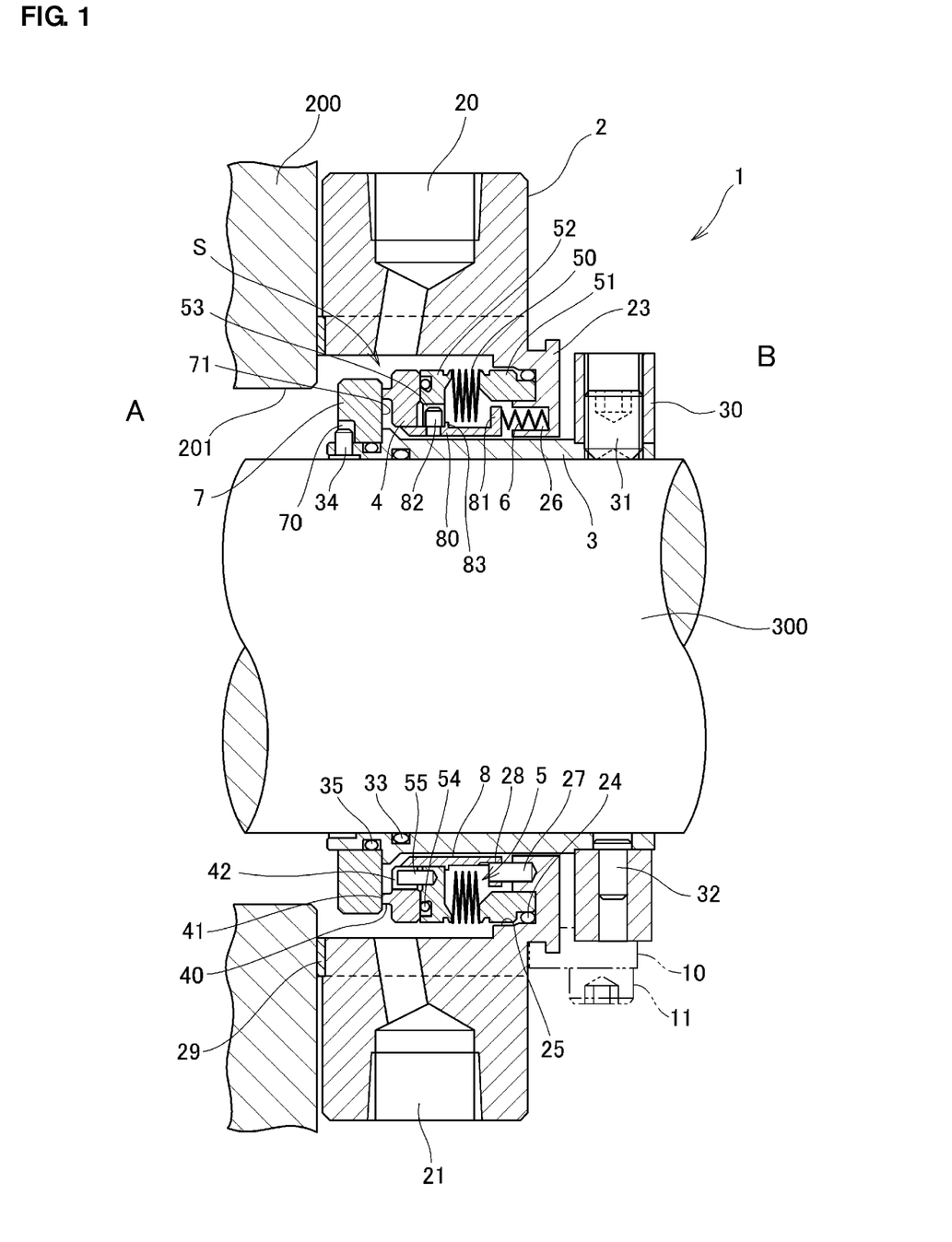
FIG. 1 is a schematic cross-sectional view of a mechanical seal device according to an embodiment of the present disclosure.
Figure 2:
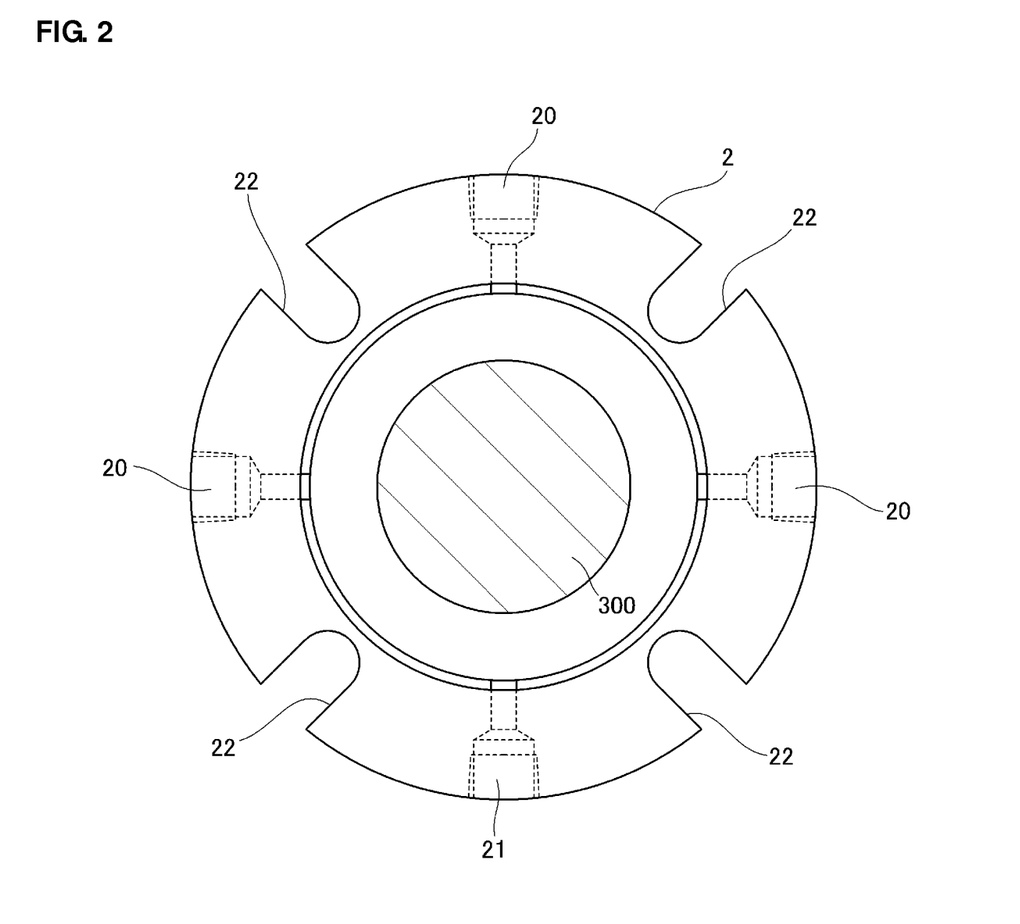
FIG. 2 is a schematic view of a seal cover when viewed in an axial direction.

With reference to FIGS. 1 and 2, a mechanical seal device according to the embodiment of the present disclosure will be described. FIG. 1 is a schematic cross-sectional view showing the configuration of the mechanical seal device according to the present embodiment. FIG. 2 is a schematic view of a seal cover in the mechanical seal device according to the present embodiment when viewed in an axial direction.

The mechanical seal device according to the present embodiment is used as a shaft seal device in a pump, a mixer, a joint, or a mill used in industrial fields such as, e.g., petroleum refining, chemistry, steel, medicine, and paper manufacturing. In the case where the mechanical seal device is used particularly in petroleum refining, a petrochemical plant, and a chemical-related plant, it is often the case that a target liquid to be sealed is a special liquid such as a high-temperature (200° C. or higher) liquid which has a high solid content concentration. Specific examples thereof include asphalt, tar, and pitch (resin). However, there are cases where a liquid which is not high in temperature and does not have a high solid content concentration is used.

<Entire Configuration>

As shown in FIG. 1, a mechanical seal device 1 according to the present embodiment is attached between a housing 200 as the casing of a pump or the like and a rotary shaft 300 which is inserted into a shaft hole 201 of the housing 200. By the mechanical seal device, the inside A of the housing 200 as a device inside is sealed from the outside (air side) B as a device outside. The mechanical seal device 1 is a cartridge-type mechanical seal device, and is configured by a seal cover 2 which is attached to the housing 200, and a sleeve 3 which is fit on the rotary shaft 300. In the seal cover 2, a fixed ring 4 as a second annular member, a bellows 5, a spring 6, and a retainer 8 are provided. In the sleeve 3, a rotary ring 7 as a first annular member is provided.

The seal cover 2 and the sleeve 3 are positioned by a set plate 10 attached to the outer peripheral surface of the sleeve 3, and are attached to the housing 200. The set plate 10 is fixed to the outer peripheral surface of the sleeve 3 with a socket bolt 11. The set plate 10 is detached when the assembly of the seal cover 2 and the sleeve 3 is ended.

<Sleeve 3>

A sleeve collar 30 is attached to the outer peripheral surface of the end portion of the sleeve 3 on the side of the device outside B. The sleeve 3 is fixed to the rotary shaft 300 with a set screw 31 together with the sleeve collar 30, and rotates together with the rotary shaft 300. The sleeve collar 30 is prevented from rotating relative to the sleeve 3 by a knock pin 32, and rotates together with the rotary shaft 300. An O ring 33 is provided between the inner peripheral surface of the sleeve 3 and the outer peripheral surface of the rotary shaft 300, and a gap between them is sealed by the O ring 33. The rotary ring 7 is fit on the outer peripheral surface of the end portion of the sleeve 3 on the side of the device inside A.

<Rotary Ring 7>

The rotary ring 7 has a concave portion 70 in a part of the inner peripheral side thereof, and a knock pin 34 attached to the sleeve 3 is fit in the concave portion 70. The rotary ring 7 is prevented from rotating relative to the sleeve 3 by the knock pin 34, and rotates together with the rotary shaft 300. In addition, an O ring 35 is provided between the inner peripheral surface of the rotary ring 7 and the outer peripheral surface of the sleeve 3, and a gap between them is sealed by the O ring 35.

The side surface of the rotary ring 7 on the side of the device outside B serves as a slide surface 71, and the slide surface 71 comes into intimate contact with a slide surface 41 of the fixed ring 4 and slides relative to the slide surface 41 with the rotation of the rotary shaft 300. A super-hard material is used for the rotary ring 7, and examples of the super-hard material include silicon carbide, tungsten carbide, carbon, and other ceramics. However, the super-hard material is not limited thereto.

<Seal Cover 2>

As shown in FIG. 2, in the seal cover 2, a plurality of flushing passages 20 and drain holes 21 are provided at regular intervals along its outer peripheral surface. Only the flushing passage 20 which is required is used, and the flushing passage 20 which is not used is plugged with a plug. In addition, in the seal cover 2, a plurality of fixing grooves 22 are provided at regular intervals in a circumferential direction. Bolts (not shown) are fit in the fixing grooves 22 and the seal cover 2 is thereby attached to the outer surface of the housing 200 (the end surface of the outer periphery of the opening portion of the shaft hole).

Further, as shown in FIG. 1, a gasket 29 made of, e.g., a resin or metal material is provided between the seal cover 2 and the housing 200, and the gasket 29 seals a gap between them.

As shown in FIG. 1, the seal cover 2 has a support portion 23 in the shape of an inward flange which extends in a radially inward direction from the end portion on the side of the device outside B. In the support portion 23, an annular concave portion 25 for holding one end of the bellows 5 and a concave portion 26 for holding the spring 6 are provided. A plurality of the concave portions 26 which are equal in number to the springs 6 are provided, and are disposed at regular intervals inside the concave portion 25 in the circumferential direction. A knock pin 27 for preventing the rotation of the retainer 8 is attached between the concave portions 26.

<Bellows 5>

The bellows 5 is a metal bellows which has an accordion-like bellows main body 50 and annular (tubular) holding portions 51 and 52 provided at both ends of the bellows main body 50. Examples of the material of the bellows 5 include alloys such as stainless steel, Inconel, Hastelloy, and Carpenter, and titanium, but the material thereof is not limited thereto. The present embodiment adopts a configuration capable of obtaining a biasing force (elastic force) of the spring 6, and hence the number of ridges of the bellows main body 50 can be set to about three to five (preferably four ridges).

The bellows 5 is attached between the support portion 23 and the fixed ring 4 of the seal cover 2. Specifically, the first holding portion 51 of the bellows 5 is fit in the annular concave portion 25 of the support portion 23 of the seal cover 2, and the second holding portion 52 thereof is assembled to the fixed ring 4 so as to abut on the fixed ring 4 in the axial direction. In addition, the bellows main body 50 of the bellows 5 is configured so as to be stretchable along the axial direction of the rotary shaft 300, and is assembled such that the biasing force which biases the fixed ring 4 toward the rotary ring 7 in the axial direction is exerted on the fixed ring 4. An O ring 24 is provided between the outer peripheral surface of the holding portion 51 and the outer peripheral surface of the concave portion 25 so as to be compressed in a radial direction, and an O ring 54 is provided between the tip surface of the holding portion 52 and the end surface of the fixed ring 4 so as to be compressed in the axial direction.

<Spring 6>

The spring 6 is disposed at a position which is located on the inside of the first end portion 51 of the bellows 50 in the radial direction and substantially side by side with the bellows main body 5 in the axial direction. A plurality of the springs 6 are disposed in the circumferential direction. The number of the springs 6 is not particularly limited, and the number thereof can be set to 4 to 24. The spring 6 is assembled between the concave portion 26 of the support portion 23 and the retainer 8 of the seal cover 2 so as to be stretchable in the axial direction. The spring 6 is assembled such that the elastic force that biases the fixed ring 4 toward the rotary ring 7 in the axial direction is exerted on the fixed ring 4 via the retainer 8 and the second end portion 52 of the bellows 5.

<Retainer 8>

The retainer 8 has a tubular portion 80 and a flange portion 81 which extends in a radially outward direction from the end portion of the tubular portion 80 on the side of the device outside B. The retainer 8 is assembled to the inner side of the bellows 5, and the outer peripheral surface of the tubular portion 80 abuts on the inner peripheral surface of the second end portion 52 of the bellows 5 and the inner peripheral surface of the fixed ring 7. In addition, the flange portion 81 of the retainer 8 compresses the spring 6 in the axial direction and retains the spring 6 between the flange portion 81 and the concave portion 26 of the support portion 23 of the seal cover 2, and receives the biasing force from the spring 6 in the axial direction.

In the retainer 8, a knock pin 82 is provided on the outer peripheral surface of the tubular portion 80 so as to protrude in the radially outward direction. The knock pin 82 is fit in a concave portion 53 provided on the inner peripheral side of the second end portion 52 of the bellows 5 and, with this, the bellows 5 is prevented from rotating relative to the retainer 8. In addition, a hole portion 28 is provided in the flange portion 81 of the retainer 8, and the knock pin 27 provided in the support portion 23 of the seal cover 2 is fit in the hole portion 28. With this, the retainer 8 is prevented from rotating relative to the seal cover 2.

In addition, in the retainer 8, a convex portion 83 which protrudes in the radial direction is provided on the outer peripheral surface of the tubular portion 80. The convex portion 83 prevents relative movement of the retainer 8, the second end portion 52 of the bellows 5, and the fixed ring 4 in the axial direction, and allows integral movement thereof in the axial direction.

<Fixed Ring 4>

The fixed ring 4 is fit on the outer periphery of the tip of the tubular portion 80 of the retainer 8 (the end portion on the side of the device inside A as a fixed end). In addition, the fixed ring 4 is assembled so as to abut on the tip surface of the second end portion 52 of the bellows 5 (the side surface on the side of the device inside A). A super-hard material is used for the fixed ring 4, and examples of the super-hard material include silicon carbide, tungsten carbide, carbon, and other ceramics. However, the super-hard material is not limited thereto.

The fixed ring 4 has an annular convex portion 40 which protrudes from a surface opposing the rotary ring 7 toward the rotary ring 7. The annular slide surface 41 at the tip of the convex portion 40 comes into contact with the slide surface 71 of the rotary ring 7, and the annular seal surface S is thereby formed. In addition, the fixed ring 4 has a concave portion 42 in a part of the inner peripheral side thereof, a knock pin 55 attached to the second end portion 52 of the bellows 5 is fit in the concave portion 42, and the fixed ring 4 is prevented from rotating relative to the end portion 52. With this, a slide surface 40a rotates and slides relative to the slide surface 71 which rotates with the rotation of the rotary shaft 300.

The surface of the fixed ring 4 opposite to the surface opposing the rotary ring 7 (the side surface on the side of the device outside B) abuts on the second end portion 52 of the bellows 5, and the fixed ring 4 receives the biasing force of the bellows 5 via the end portion 52 and receives the biasing force of the spring 6 via the retainer 8 and the end portion 52. With this, the adhesion of the seal surface S to a relative positional fluctuation of the fixed ring 4 and the rotary ring 7 in the axial direction is increased.

<Others>

Examples of the material of the O rings 24, 33, 35, and 54 include nitrile rubber, EPDM, FKM, and FFKM. In the case where corrosion resistance is required, examples thereof include FFKM (Kalrez (registered trademark) or the like). However, the material is not limited thereto.

Figure 3:
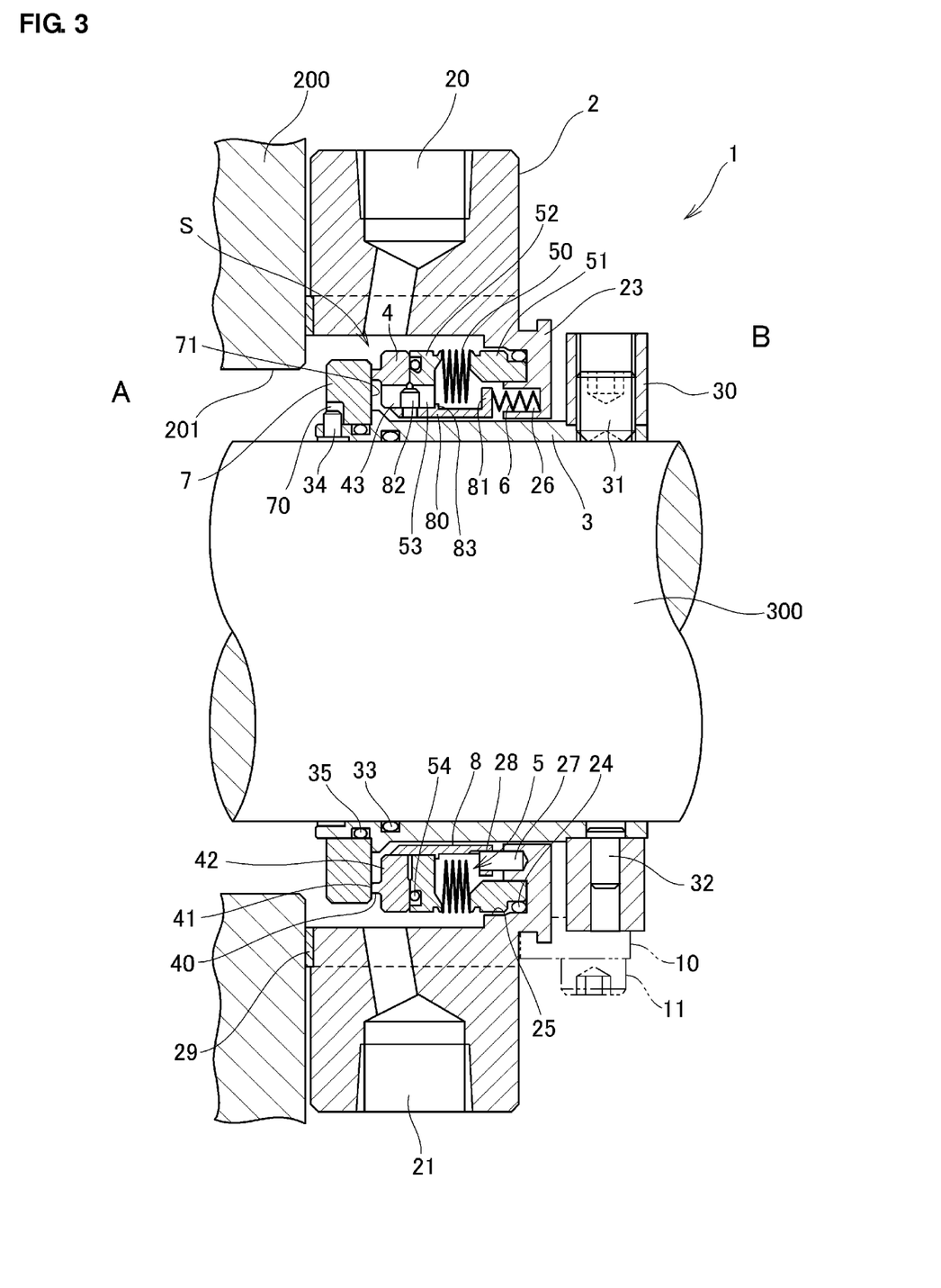
FIG. 3 is a schematic cross-sectional view of a mechanical seal device according to a first modification of the present disclosure.
Figure 4:
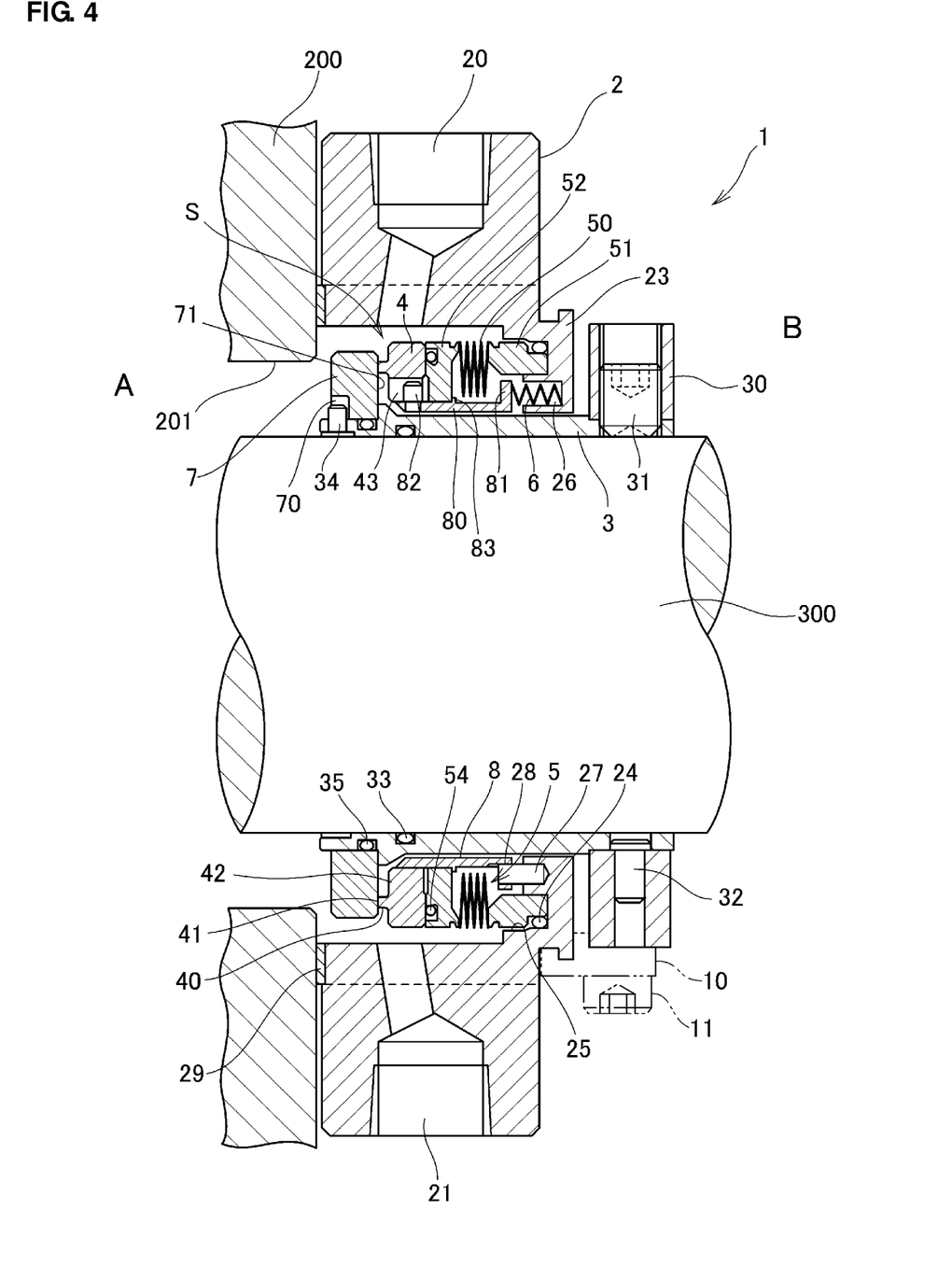
FIG. 4 is a schematic cross-sectional view of a mechanical seal device according to a second modification of the present disclosure.

Each of FIGS. 3 and 4 is a schematic cross-sectional view showing the configuration of a mechanical seal device according to a modification of the present embodiment. The integral configuration of the fixed ring 4, the bellows 5, and the retainer 8 is not limited to the configuration described in the above embodiment, and various configurations can be adopted.

In a first modification shown in FIG. 3, a concave portion 43 is provided on the inner peripheral side of the fixed ring 4, and a part of the knock pin 82 of the retainer 8 is fit in the above concave portion 43. A part of the knock pin 82 is also fit in the concave portion 53 of the second end portion 52 of the bellows 5. With this, the bellows 5 and the fixed ring 4 are prevented from rotating by the retainer 8.

In a second modification shown in FIG. 4, the configuration of preventing the rotation of the bellows 5 is not adopted. That is, the concave portion 53 provided in the second end portion 52 of the bellows 5 in the above embodiment is not provided in the present modification. The knock pin 82 of the retainer 8 is fit in the concave portion 43 provided on the inner peripheral side of the fixed ring 4, and the fixed ring 4 is prevented from rotating relative to the retainer 8. When the rotation of the fixed ring 4 can be prevented in spite of the rotation of the rotary shaft 300, the propagation of the rotation to the bellows 5 is less likely to occur, and hence the bellows 5 scarcely rotates even when the configuration of preventing the rotation of the bellows 5 is not provided. Consequently, it is possible to simplify the configuration of the metal bellows 5 which requires high manufacturing cost and reduce the cost.

<Advantages of the Present Embodiment>

The mechanical seal device 1 according to the present embodiment has the configuration in which the bellows 5 and the spring 6 are substantially arranged in the axial direction of the rotary shaft 300. That is, unlike the conventional art, the mechanical seal device 1 has the configuration in which the bellows 5 and the spring 6 are not arranged in the radial direction. With this, it is possible to make the radial dimensions of the entire device more compact than in the conventional art. Consequently, in the cartridge-type mechanical seal device, it is possible to relieve restrictions on the attachment space and increase the range of devices to which the cartridge-type mechanical seal device can be attached.

In addition, the mechanical seal device 1 according to the present embodiment is configured such that the outer side of the bellows 5 in the radial direction is on the side of the device inside A as the side of a target region to be sealed. That is, the target liquid to be sealed is sealed on the outside of the bellows 5. With this, even when slurry or the like contained in the target liquid to be sealed is moved outward by the centrifugal force caused by the rotation of the rotary shaft 300, unlike the conventional art, the slurry is not deposited in the groove of the bellows 5. Consequently, an effect on the stretchability of the bellows 5 resulting from the deposition of the slurry or the like seen in the conventional art does not occur, and it is possible to maintain performance in long-term use.

Further, in the mechanical seal device 1 according to the present embodiment, the spring 6 is disposed on the side of the device outside B. Consequently, an effect on performance resulting from corrosion caused by the target liquid to be sealed, deposition of the slurry or the like which is similar to that in the bellows 5, or clogging therewith does not occur, and it is possible to maintain the performance in long-term use.

EXPLANATION OF REFERENCE NUMERALS

1 mechanical seal device
200 housing
300 rotary shaft
2 seal cover
3 sleeve
4 fixed ring
5 bellows
6 spring
7 rotary ring
8 retainer

The invention claimed is:

1. A mechanical seal device which seals a space between a shaft hole provided in a housing and a rotary shaft inserted into the shaft hole and hence seals a liquid in the housing, comprising:
    a first annular member which is fixed to the rotary shaft;
    a second annular member which is slidably in contact with the first annular member and forms an annular seal surface;
    a metal bellows which supports the second annular;
    a biasing member which biases the second annular member toward the first annular member;
    a seal cover which is attached to the housing, supports the metal bellows such that an outer peripheral surface of the metal bellows is on an inside of the housing relative to the seal surface, and supports the biasing member at a position located on an outside of the housing relative to the annular seal surface and side by side with the bellows in an axial direction of the rotary shaft;
    a retainer which has a tubular portion fixed to a second annular member and extending from the fixed end in the axial direction on an inner peripheral side of the metal bellows and a flange portion extending from an end portion opposite to the fixed end of the tubular portion in a radially outward direction and receiving a biasing force of the biasing member.

* * * * *